(12) United States Patent
Wollum et al.

(10) Patent No.: US 6,486,236 B2
(45) Date of Patent: Nov. 26, 2002

(54) ASPHALT COMPOSITION COMPRISING BISMALEIMIDES

(75) Inventors: Mark H. Wollum, Wilmington, NC (US); Daniel F. Graves, Canal Fulton, OH (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

(21) Appl. No.: 09/750,599

(22) Filed: Dec. 28, 2000

(65) Prior Publication Data

US 2002/0123542 A1 Sep. 5, 2002

(51) Int. Cl.⁷ .............................................. C08L 95/00
(52) U.S. Cl. .............................. 524/68; 524/59; 524/71
(58) Field of Search ................................ 524/59, 68, 71

(56) References Cited

U.S. PATENT DOCUMENTS

| | | | |
|---|---|---|---|
| 4,259,468 A | * 3/1981 | Kajiura et al. | 526/283 |
| 4,330,449 A | 5/1982 | Maldonado et al. | 524/68 |
| 5,138,000 A | * 8/1992 | Kramer | 526/262 |
| 5,256,710 A | 10/1993 | Krivohlavek | 524/68 |
| 5,698,651 A | * 12/1997 | Kawasaki et al. | 526/336 |
| 6,117,951 A | 9/2000 | Liu et al. | 525/426 |

OTHER PUBLICATIONS

Asphalt, Encyclopedia of Chemical Technology, vol. 3, Fourth Edition, pp. 689–724.

* cited by examiner

*Primary Examiner*—Peter Szekely
(74) *Attorney, Agent, or Firm*—Meredith Palmer; Scott McCollister

(57) ABSTRACT

A rubber-modified asphalt composition is provided. The rubber includes at least a polydiene and may further include vinyl-substituted aromatic hydrocarbon monomer contributed units. The rubber is cured by a bismaleimide. The present composition demonstrates improvements in the softening point of the asphalt composition.

19 Claims, No Drawings

ASPHALT COMPOSITION COMPRISING BISMALEIMIDES

FIELD OF THE INVENTION

This invention relates to asphalt compositions. More specifically, this invention relates to rubber-modified asphalt compositions with an improved softening point.

BACKGROUND OF THE INVENTION

Asphalt has become an important material for building and repairing roads. It is also used in applications such as roofing and weather sealing. The estimated annual use of asphalt in the United States alone is over 13 million kilograms.

The addition of rubber to asphalt can improve properties such as crack resistance, softening points, viscosity, tensile strength, elongation, toughness, and tenacity. It has also been shown that curing agents can be used to further improve asphalt properties. Curing agents often used in asphalt compositions are phenolic resins and elemental sulfur. However, phenolic resins require long curing times and elemental sulfur must typically be used in large quantities.

It would therefore be desirable to find a better curing agent for rubber-modified asphalt compositions which is capable of overcoming the above-mentioned problems of typical curing agents while still improving the physical characteristics (e.g. softening point) of asphalt compositions.

SUMMARY OF THE INVENTION

In one embodiment, an asphalt composition is provided. The asphalt composition includes at least a rubber, asphalt, and a bismaleimide curing agent. The rubber includes at least polydiene, and may include additional monomer units such as vinyl-substituted aromatic hydrocarbons. In another embodiment, a method for producing an asphalt composition is provided.

Asphalt compositions containing rubbers cured with bismaleimides exhibit beneficial properties. For example, the use of a bismaleimide curing agent results in improvements to the softening point of the asphalt composition while maintaining desirable tenacity levels. As known to the skilled artisan, tenacity levels represent the asphalt's strength, toughness, and durability, and is a measure of the resilience of the asphalt at room temperature. The softening point of the present asphalt compositions is between about 35 and 120° C., preferably between about 45 and 95° C.

DETAILED DESCRIPTION OF ILLUSTRATIVE EMBODIMENTS

The present asphalt composition includes at least a rubber, asphalt, and a bismaleimide curing agent. The rubber is preferably a polydiene, and may include additional monomer units such as vinyl-substituted aromatic hydrocarbons.

The preferred rubber is at least a polydiene. Exemplary diene contributed monomer units include 1,3-butadiene, isoprene, 2,3-dimethyl-1,3-butadiene, 1,4-pentadiene, and 1,3-pentadiene. Preferred diene contributed monomer units are 1,3-butadiene and isoprene. The rubber may include monomer units contributed from more than one diene molecule. For example, the rubber may be a poly(1,3-butadiene-co-isoprene).

In addition, the rubber may also contain additional monomer contributed units. Exemplary monomer contributed units include vinyl-substituted aromatic hydrocarbons. Suitable vinyl-substituted aromatic hydrocarbons include styrene, α-methylstyrene, 1-vinylnphthalene, 2-vinylnaphthalene, 1-α-methyl vinylnaphthalene, 2α-methyl vinylnaphthalene, as well as alkyl cycloalkyl, aryl, alkaryl, and aralkyl derivatives thereof, and di-or tri-vinyl-substituted aromatic hydrocarbons. A preferred vinyl-substituted aromatic hydrocarbon is styrene.

The rubber is preferably any of styrene-butadiene diblock polymers, as well as any styrene-butadiene, polybutadiene, polyisoprene, styrene-isoprene block or random polymers, styrene-butadiene block or random polymers, and mixtures thereof The rubber compositions may optionally be vinyl-modified to create high vinyl conjugated diene monomer units. A 1,2-microstructure controlling agent or randomizing modifier may be used to control the vinyl content in the conjugated diene contributed monomer units. Suitable modifiers include hexamethylphosphoric acid triamide, N,N,N', N'-tetramethylethylene diamine, ethylene glyclol dimethyl ethyer, diethylene glycol dimethyl ether, triethylene gylcol dimethyl ether, tetraethylene glycol dimethyl ether, tetrahydrofuran (THF), 1,4-diazabicyclo [2.2.2] octane, diethyl ethyer, triethylamine, tri-n-butylphosphine, p-dioxane, 1,2-dimethyoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes, 2,2-bis-(4-methyl dioxane), and bistetrahydrofuryl propane. One or more vinyl modifiers may be used. As the modifier charge increases, the percentage of 1,2-microstructure (vinyl content) increases in the conjugated diene contributed monomer units. Vinyl-modified conjugated diene polymers and trans-cis conjugated diene polymers are equally applicable in the present invention.

The rubber compositions may also be further functionalized to contain different organic functional groups useful in the formation of the present asphalt composition. Suitable functional groups include carboxy, hydroxy, formyl, amino, halo, and alkyl. Amino functionalized rubbers are especially preferred due to their increased ability to interact with bismaleimides.

The rubber composition is preferably cured with a bismaleimide. Importantly, however, the present invention contemplates curing the rubber with a bismaleimide prior to or after combining it with asphalt. Suitable bismaleimides for use as rubber curing agents are represented by either of the following formulas:

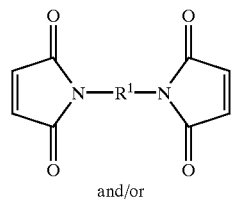
and/or

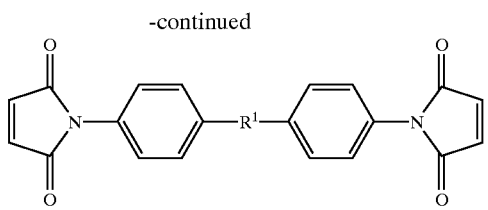

wherein $R^1$ may be an aromatic group, a aliphatic group, a cycloaliphatic group, or an aliphatic group containing siloxane. However, any bismaleimide known to the skilled artisan may be employed inthe present asphalt compositions.

Bismaleimides may be prepared by a variety of techniques. One method of preparation entails formation of the maleamic acid via reaction of the corresponding primary amine with maleic anhydride, followed by dehydrative closure of the maleamic acid with acetic anhydride.

A variety of other approaches may also be employed. For example, dicyclohexylcarbodiimide (DCC) closes maleamic acids. With DCC, the product is exclusively isomaleimide. However in the presence of suitable isomerizing agents, such as 1-hydroxybenzotriazole (HOBt), the product is almost solely the maleimide. The function of the HOBt could allow the closure to proceed via the HOBt ester of the maleamic acid (formed via the agency of DCC) which presumably closes preferentially to the maleimide.

Suitable bismaleimides formed by the outlined methods or available commercially include N,N'-ethylene-bis-maleimide, N,N'-butylene-bis-maleimide, N,N'-phenylene-bis-maleimide, N,N'-hexamethylene-bis-maleimide, N,N'-4,4'-diphenyl methane-bis-maleimide, N,N'-4,4'-diphenyl ether-bis-maleimide, N,N'-4,4'-diphenyl sulfone-bis-maleimide, N,N'-4,4'-dicyclohexyl methane-bis-maleimide, N,N'-xylylene-bis-maleimide, N,N'-diphenyl cyclohexane-bis-maleimide, N,N'-(m-phenylene)bismaleimide, N,N'-(p-phenylene)-bismaleimide, N,N'-(p-tolylene)bismaleimide, N,N'-(methylenedi-p-phenylene)-bismaleimide, N,N'-(oxydi-p-phenylene)bismaleimide, α,α,-bis-(4-phenylene)-bismaleimide, N,N'-(m-xylylene)bis-citraconimide, α,α-bis-(4-maleimidophenyl)-meta-diisopropylbenzene, and mixtures thereof.

Asphalts, as the term is use herein, include cementitious materials in which the predominating constituents are bitumens that occur in nature or are obtained in petroleum processing. Bitumen is a term which encompasses cementitious substances, natural or manufactured, composed principally of high molecular weight hydrocarbons, of which asphalts, tars, pitches, and asphalitites are typical. Asphalts are often classified as solids, semisolids, or liquids. They are often defined as the manufactured materials that are produced during petroleum processing. Asphalts characteristically contain very high molecular weight molecular polar species, called asphaltenes, which are soluble in carbon disulfide, pyridine, aromatic hydrocarbons, chlorinated hydrocarbons, and THF. Asphalts produced from the refining of petroleum have been used primarily in paving and roofing applications.

When asphalt polymer blends are prepared for use, given portions of polymer are blended into the molten asphalt at a specified temperature in conjunction with, or prior to, the addition of a curing agent. The rubber is dissolved in molten asphalt at temperatures greater than about 120° C. The rubber may be added to the asphalt in a range of about 1 to 50 parts by weight (pbw) rubber per 100 pbw asphalt, preferably in a range of about 2 to 25 pbw, and most preferably in a range of about 4 to 14 pbw. After the rubber has fully dissolved, at least one bismaleimide curing agent is added to the composition. Alternatively, the curing agent (s) may be added to the molten asphalt simultaneously with the rubber. The curing agent is preferably added in amounts between about 0.5 and 3 wt % of the total composition, more preferably between about 0.25 and 2 wt % of the total composition. After mixing, for example between about 25 and 400 minutes, more preferably between about 50 and 300 minutes, a homogeneous mixture is obtained. The mixing temperature is preferably between about 145 and 205° C., most preferably between about 160 and 193° C.

In the following, the present invention will be described in more detail with reference to non-limitative examples. The following examples and table are presented for purposes of illustration only and are not to be construed in a limiting sense.

EXAMPLES

In an exemplary example, 275 g AC-20 asphalt (Citgo, Inc) was brought to approximately 175° C. in a lab mixer through the use of a feedback type heating mantel. The asphalt is agitated with a cowles type mixing head, and 11.5 g rubber and 1.44 g curing agent were added in one unit to the asphalt. The samples were mixed until visually homogeneous.

Physical details of the various mixtures are shown in table 1. In Table 1, PD 4312 represents a vinyl modified styrene-butadiene diblock obtained from Firestone Polymers with a vinyl content of about 33%, PD 4377 represents a styrene-butadiene diblock with amine functionality obtained from Firestone Polymers with a vinyl content of about 13%, PD 4305 represents a styrene-butadiene diblock obtained from Firestone Polymers with a vinyl content of about 8%, BLC-720-C represents a phenolic resin obtained from Tex-Par Energy, and HVA-2 is a N,N'-(m-phenylene) bis-maleimide obtained from DuPont-Dow. Table 1 shows the improvement in the softening point of asphalt compositions cured with bismaleimides relative to those cured with phenolic resins. The toughness and tenacity are measured according to ASTM D5801.

TABLE 1

| Formulation | A | B | C | D | E | F | G | H | I | J | K | L | M | N | O | P |
|---|---|---|---|---|---|---|---|---|---|---|---|---|---|---|---|---|
| Citgo AC-20 Asphalt wt % | 100 | 99.8 | 99.5 | 99 | 96 | 95.8 | 95.5 | 95 | 96 | 95.8 | 95.5 | 95 | 96 | 95.8 | 95.5 | 95 |
| PD 4312 | | | | | 4 | 4 | 4 | 4 | | | | | | | | |
| PD 4377 | | | | | | | | | 4 | 4 | 4 | 4 | | | | |
| Pd 4305 | | | | | | | | | | | | | 4 | 4 | 4 | 4 |
| BLC-720-C | | 0.2 | | | | 0.2 | | | | 0.2 | | | | 0.2 | | |
| HVA-2 | | | 0.5 | 1 | | | 0.5 | 1 | | | 0.5 | 1 | | | 0.5 | 1 |
| Mixing time, minutes | | 180 | 90 | 90 | 120 | 315 | 210 | 210 | 120 | 390 | 210 | 210 | 75 | 270 | 165 | 165 |

TABLE 1-continued

| Formulation | A | B | C | D | E | F | G | H | I | J | K | L | M | N | O | P |
|---|---|---|---|---|---|---|---|---|---|---|---|---|---|---|---|---|
| Softening Point, °C. | 49.5 | 51.7 | 52.3 | 61.1 | 58.3 | 72.6 | 62.7 | 69.3 | 61.6 | 75.9 | 69.3 | 85.8 | 57.8 | 60 | 62.7 | 69.3 |
| Viscosity @ 135° C. cPs | 396 | 480 | 523 | 658 | 1494 | 15400 | 1992 | 3655 | 1432 | 2375 | 2157 | 4350 | 1110 | 1272 | 1440 | 2280 |
| Toughness, cm-kg | 47.1 | 62.8 | 68.9 | 89.9 | 49.3 | 235.5 | 91.4 | 170.4 | 68.7 | 260.5 | 95.3 | 179.2 | 53.7 | 322 | 70.5 | 142 |
| Tenacity, cm-kg | 12.5 | 12.6 | 5.32 | 2.2 | 11.2 | 165.6 | 13.8 | 24.5 | 18.3 | 188.6 | 31.1 | 72.2 | 6.1 | 258.1 | 6.1 | 54.8 |

Although the invention has been described with reference to exemplary embodiments, various changes and modifications can be made without departing from the scope and spirit of the invention. These modifications are intended to fall within the scope of the invention as defined by the claims.

We claim:

1. An asphalt composition comprising:
   a. asphalt,
   b. about 2–25 pbw rubber per 100 pbw asphalt, and
   c. at least one bismaleimide.

2. The composition of claim 1 wherein said rubber comprises polydiene.

3. The composition of claim 2 wherein said polydiene comprises monomer units selected from the group consisting of 1,3-butadiene, isoprene, 2,3-dimethyl-1,3-butadiene, and 1,3-pentadiene, and mixtures thereof.

4. The composition of claim 3 wherein said polydiene is poly(1,3-butadiene).

5. The composition of claim 2 wherein said rubber further comprises vinyl-substituted aromatic hydrocarbon monomer units.

6. The composition of claim 5 wherein said vinyl-substituted aromatic hydrocarbon monomer units are selected from the group consisting of styrene, α-methylstyrene, 1-vinylnaphthalene, 2-vinylnaphthalene, 1-α-methyl vinylnaphthalene, 2-α-methyl vinylnaphthalene, as well as alkyl, cylcloalkyl, aryl, alkaryl, and aralkyl derivatives thereof, and di- or tri- vinyl substituted aromatic hydrocarbons, and mixtures thereof.

7. The composition of claim 1 wherein said bismaleimide is represented by the general formulas:

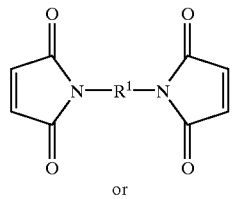

or

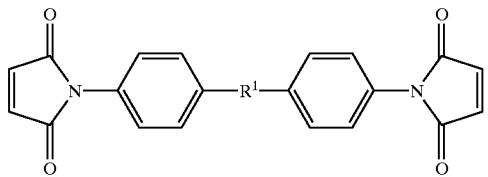

and mixtures thereof, wherein $R^1$ is one or more of an aromatic group, an aliphatic group, a cycloaliphatic group, and an aliphatic group containing siloxane.

8. The composition of claim 1 wherein said bismaleimide is selected from the group consisting of N,N'-ethylene-bis-maleimide, N,N'-butylene-bis-maleimide, N,N'-phenylene-bis-maleimide, N,N'-hexamethylene-bis-maleimide, N,N'-4,4'-diphenyl methane-bis-maleimide, N,N'-4,4'-diphenyl ether-bis-maleimide, N,N'-4,4'-diphenyl sulfone-bis-maleimide, N,N'4,4'-dicyclohexyl ethane-bis-maleimide, N,N'-xylylene-bis-maleimide, N,N'-diphenyl cyclohexane-bis-maleimide, N,N'-(m-phenylene)bismaleimide, N,N'-(p-phenylene)-bismaleimide, N,N'-(p-tolylene)bismaleimide, N,N'-(methylenedi-p-phenylene)-bismaleimide, N,N'-(oxydi-p-phenylene)bismaleimide, α,α-bis-(4-phenylene)-bismaleimide, N,N'-(m-xylylene)bis-citraconimide, α,α-bis-(4-maleimidophenyl)-meta-diisopropylbenzene, and mixtures thereof.

9. The composition of claim 1 wherein said bismaleimide is added in the amounts between about 0.05 and 3 wt % of the asphalt composition.

10. The composition of claim 1 having a softening point between about 55 and 95° C.

11. A method for producing an asphalt composition comprising mixing at elevated temperatures:
   a. asphalt
   b. about 2–25 pbw rubber per 100 pbw asphalt, and
   c. at least one bismaleimide.

12. The method of claim 11 wherein said rubber comprises polydiene.

13. The method of claim 13 wherein said polydiene monomer contributed units are chosen from the group consisting of 1,3-butadiene, isoprene, 2,3-dimethyl-1,3-butadiene, 1,3-pentadiene, and mixtures thereof.

14. The method of claim 13 wherein said polydiene comprises 1,3-butadiene monomer contributed units.

15. The method of claim 13 wherein said rubber further comprises vinyl-substituted aromatic hydrocarbon contributed monomer units.

16. The method of claim 12 wherein said bismaleimide is represented by the general formulas.

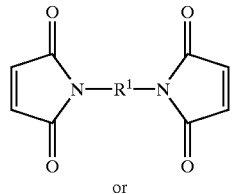

or

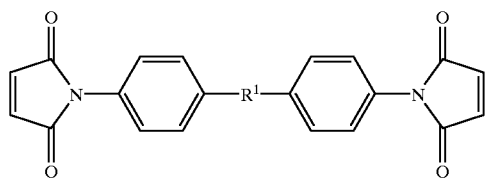

and mixtures thereof, wherein $R^1$ is one or more of an aromatic group, an aliphatic group, a cycloaliphatic group, and an aliphatic group containing siloxane.

17. The method of claim 17 wherein said bismaleimide is selected from the group consisting of N,N'-ethylene-bismaleimide, N,N'-butylene-bis-maleimide, N,N'-phenylene-bis-maleimide, N,N'-hexamethylene-bis-maleimide, N,N'-4,4'-diphenyl methane-bis-maleimide, N,N'-4,4'-diphenyl ether-bis-maleimide, N,N'4,4'-diphenyl sulfone-bis-maleimide, N,N'-4,4'-dicyclohexyl methane-bis-maleimide, N,N'-xylylene-bis-maleimide, N,N'-diphenyl cyclohexane-bis-maleimide, N,N'-(m-phenylene)bismaleimide, N,N'-(p-phenylene)-bismaleimide, N,N'-(p-tolylene)bismaleimide, N,N'-(methylenedi-p-phenylene)-bismaleimide, N,N'-(oxydi-p-phenylene)bismaleimide, α,α-bis-(4-phenylene)-bismaleimide, N,N'-(m-xylylene)bis-citraconimide, α,α-bis-(4-maleimidophenyl)-meta-diisopropylbenzene, and mixtures thereof.

18. The method of claim 16 wherein said bismaleimide is added in the amounts between about 0.05 and 3 pbw of polymer.

19. The method of claim 11 wherein the components are mixed together at a temperature between about 145 and 205° C. for between about 25 and 400 minutes.

* * * * *